United States Patent [19]

Mori et al.

[11] Patent Number: 5,393,554
[45] Date of Patent: Feb. 28, 1995

[54] CREAM COMPOSITION

[75] Inventors: Urara Mori, Sakai; Satoru Morinaga, Sennan; Tsukasa Kiyama, Kobe; Masaaki Miyabe; Masayuki Yamaguchi, both of Sennan, all of Japan

[73] Assignee: Fuji Oil Company, Limited, Osaka, Japan

[21] Appl. No.: 175,532

[22] Filed: Dec. 30, 1993

Related U.S. Application Data

[63] Continuation-in-part of Ser. No. 851,787, Mar. 16, 1992, abandoned.

[30] Foreign Application Priority Data

May 29, 1991 [JP] Japan .................. 3-155653

[51] Int. Cl.6 .............................. A23C 13/12
[52] U.S. Cl. .................... 426/662; 426/602
[58] Field of Search ............ 426/602, 601, 586

[56] References Cited

U.S. PATENT DOCUMENTS

| 3,840,682 | 10/1974 | Kubota | 426/602 |
| 4,298,625 | 11/1981 | Cillario | 426/602 |
| 4,336,272 | 6/1982 | Verrips et al. | 426/602 |
| 4,461,777 | 7/1984 | Murase et al. | 426/602 |
| 5,135,768 | 8/1992 | Campbell et al. | 426/602 |

FOREIGN PATENT DOCUMENTS

| 5-165751 | 12/1980 | Japan | 426/602 |
| 56-54136 | 12/1981 | Japan | 426/586 |
| 60-262550 | 12/1985 | Japan | 426/586 |
| 61-25456 | 2/1986 | Japan | 426/602 |
| 61-166372 | 7/1986 | Japan | 426/602 |
| 2-48034 | 2/1990 | Japan | 426/602 |
| 2-60559 | 3/1990 | Japan | 426/602 |
| 2-154044 | 2/1992 | Japan . | |

*Primary Examiner*—Carolyn Paden
*Attorney, Agent, or Firm*—Wenderoth, Lind & Ponack

[57] ABSTRACT

There is described a cream composition in the form of an O/W type emulsion in which a mixture of raw materials containing an oil, SNF and water is emulsified with a combination of lysolecithin and polyglycerin fatty acid ester.

1 Claim, No Drawings

CREAM COMPOSITION

This application is a continuation-in-part application of application Ser. No. 07/851,787, filed Mar. 16, 1992, now abandoned.

FIELD OF THE INVENTION

The present invention relates to a cream composition comprising an O/W type emulsion in which a mixture of raw materials containing, at least, an oil, solids-not-fat (SNF) and water is emulsified with an emulsifying agent to form the emulsion. In particular, it relates to a cream composition which is resistant to emulsion break to prevent the composition from, for example, separation of its oil ingredient and rapid increase in viscosity, even when the composition is used for foods to be subjected to heat treatment at a high temperature, for example, foods to be subjected to retort treatment.

BACKGROUND OF THE INVENTION

In general, as creams, cream compositions obtained by emulsifying a mixture of raw materials containing, at least, an oil, SNF and water with an emulsifying agent to form an emulsion have been used. And, as emulsifying agents, there have been used glycerin fatty acid esters, sorbitan fatty acid esters, sucrose fatty acid esters, polyglycerin fatty acid esters, propyleneglycol fatty acid esters, organic acid monoglycerides, lecithin and the like. JP-A 2-16946 discloses the use of lysolecithin obtained by treating lecithin with an enzyme.

The above-described creams have been used in fresh cream, ice cream and the like. Further, they are used in various other foods which are cooked with salt, an acid and the like, for example, stew with cream.

Recently, various foods containing the above-described creams and packed in pouches which are to be subjected to heat treatment at a high temperature such as retort treatment have been developed.

However, the above-described creams have drawbacks in that, when foods containing such creams are heated to a high temperature, their oil ingredients are separated therefrom and/or the viscosity thereof is remarkably increased, which results in deterioration of quality of foods. Further, fluidity of foods using them is lowered, which makes operations such as removing foods from pouches difficult.

OBJECTS OF THE INVENTION

The main object of the present invention is to minimize the above-described drawbacks of conventional creams used in various foods.

That is, the main object of the present invention is to provide a cream composition in which the above-described drawbacks are minimized and, when foods containing it are heated to a high temperature, its oil ingredient is hardly separated therefrom and/or the viscosity thereof is hardly increased and, thereby, deterioration of quality of foods is prevented. Further, fluidity of foods containing the cream composition is hardly lowered, which facilitates operations such as removing foods from pouches.

This object as well as other objects and advantages of the present invention will become apparent to those skilled in the art from the following description.

SUMMARY OF THE INVENTION

The present inventors have studied why an oil is separated from a cream and viscosity is remarkably increased when foods containing the cream is subjected to high temperature heat treatment such as retort treatment and the like. As a result, it has been found that, when a cream itself is heated at a higher temperature, or a cream together with salt, an acid and the like are heated at a high temperature, emulsion of the cream by an emulsifying agent is broken, which results in separation of an oil from the cream or a remarkable increase in the viscosity of the cream.

Then, the present inventors have further studied an emulsifying agent to be used in the production of a cream and have attained the present invention.

That is, according to the present invention, there is provided a cream composition comprising an O/W type emulsion in which a mixture of raw materials containing at least an oil, SNF and water is emulsified with an emulsifying agent comprising at least lysolecithin and polyglycerin fatty acid ester.

DETAILED DESCRIPTION OF THE INVENTION

The mixture of raw materials used in the cream composition of the present invention normally comprises not less than 5% by weight, preferably, 20 to 80% by weight of an oil (e.g., rape oil, soybean oil, cocoa oil, palm oil, etc.), not more than 20% by weight, preferably not more than 10% by weight, more preferably 1 to 10 % by weight of SNF (e.g., skimmed milk powder, etc.) and 10 to 90% by weight, preferably 20 to 80% by weight of water.

The emulsification is normally carried out by using 0.05 to 2% by weight of lysolecithin together with 0.05 to 2% by weight of polyglycerin fatty acid ester based on the amount of mixture of the raw materials. The polyglycerin fatty acid ester is used in an amount of at most 4 parts by weight, preferably, 0.2 to 3 parts by weight, more preferably 0.5 to 2 parts by weight, per 1 part by weight of lysolecithin so as to obtain a desired emulsion state. Examples of the polyglycerin fatty acid ester include those having a degree of polymerization of polyglycerin is about 4 to 10 such as tetraglycerin fatty acid ester, pentaglycerin fatty acid ester, hexaglycerin fatty acid ester, heptaglycerin fatty acid ester, octaglycerin fatty acid ester, nonaglycerin fatty acid ester, decaglycerin fatty acid ester and the like. Examples of the fatty acid include stearic acid, oleic acid, lauric acid and the like.

In the present invention, in addition to lysolecithin and polyglycerin fatty acid ester, one or more other emulsifying agents such as sucrose fatty acid ester and the like can be used. Further, salts such as sodium citrate and the like can be added. Furthermore, conventional food additives such as coloring agents, flavors, spices and the like may also be added thereto.

The cream composition of the present invention can be produced by adding the emulsifying agent to the mixture of raw materials and emulsifying the resulting mixture according to a known method to obtain a O/W type emulsion.

The cream composition of the present invention can be used in the same manner as conventional creams.

In the present invention, since at least lysolecithin and polyglycerin fatty acid ester are used as emulsifying agents to produce the cream composition, even when food using the cream composition alone or together with salt, an acid and the like is subjected to heat treatment at a high temperature such as retort treatment, its oil ingredient is hardly separated therefrom and/or viscosity thereof is hardly increased.

The following Examples and Comparative Examples further illustrate the present invention in detail but are not to be construed to limit the scope thereof. All "parts" and "percents" are by weight unless otherwise stated.

EXAMPLE 1

In this Example, 40.5 parts of rape hardened oil (HRW-22 manufactured by Fuji Oil Company, Limited, Japan), 0.5 part of sodium caseinate (Sunlacto S-12 manufactured by Taiyo Kagaku K.K., Japan), 3.5 parts of skimmed milk powder and 55.5 parts of water were used as raw materials.

As emulsifying agents, 0.3 part of lysolecithin (Sunlecithin S manufactured by Taiyo Kagaku K.K., Japan), 0.50 part of decaglycerin monostearate (MSW 750 manufactured by Sakamoto Yakuhin Kogyo K.K., Japan) and 0.20 part of sucrose fatty acid ester (S570 manufactured by Mitsubishikasei Shokuhin K.K., Japan) were used. Further, 0.05 part of disodium phosphate, 0.10 part of sodium hexametaphosphate and 0.02 part of sodium bicarbonate were added.

These ingredients were mixed and provisionally emulsified with a homomixer at 70° C. for 15 minutes. The mixture was subjected to primary homogenization with a homogenizer at the pressure of 70 kg/cm². Then, the homogenized mixture was sterilized at 145° C. for 4 to 5 seconds and the mixture was further subjected to secondary homogenization at the pressure of 70 kg/cm². The latter homogenized mixture was cooled to obtain the desired cream composition.

COMPARATIVE EXAMPLES 1 TO 3

In these Comparative Examples, each cream composition was produced according to the same manner as that described in Example 1 except that a different emulsifying agent was used.

In Comparative Example 1, only above-described lecithin was used in the amount of 1.0 part as the emulsifying agent. In Comparative Example 2, only above-described lysolecithin was used in the amount of 1.0 part by weigh as the emulsifying. In Comparative Example 3, only above-described decaglycerin monostearate was used in the amount of 1.0 part as the emulsifying agent.

Then, regarding the cream compositions of Example 1 and Comparative Examples 1 to 3, the change of properties thereof was evaluated after heat treatment at a higher temperature.

The following samples were evaluated for respective Example and Comparative Examples:

Sample 1: the cream compositions of Example 1 and Comparative Examples 1 to 3 per se;

Sample 2: 20 g of 10% aqueous solution of salt was added to 180 g of the cream composition; and Sample 3: 20 g of 4% aqueous solution of citric acid was added to 180 g of the cream composition to make acidic.

Samples 1 to 3 were sterilized with a retort at 120° C. for 30 minutes, respectively. After sterilization, oil separation of the respective samples was observed. After storing the sterilized samples overnight in a refrigerator, the change in viscosity [cp] before and after sterilization was measured. The results are shown in Table 1.

In Table 1, symbols of oil separation represents as follows:

A: no oil separation;

B: oil separation.

Regarding the change in viscosity, "mass" means that the viscosity cannot be measured because of mass formation.

TABLE 1

| Samples | | Oil separation | Viscosity [cp] Before heating | After heating |
|---------|----------|----|----|------|
| Ex. 1 | Sample 1 | A | 60 | 70 |
| | Sample 2 | A | 36 | 46 |
| | Sample 3 | A | 36 | 89 |
| Comp. Ex. 1 | Sample 1 | A | 50 | 75 |
| | Sample 2 | B | 50 | mass |
| | Sample 3 | B | 50 | mass |
| Comp. Ex. 2 | Sample 1 | A | 50 | 3175 |
| | Sample 2 | A | 50 | 205 |
| | Sample 3 | A | 50 | mass |
| Comp. Ex. 3 | Sample 1 | B | 50 | mass |
| | Sample 2 | A | 50 | mass |
| | Sample 3 | B | 50 | mass |

As is seen from Table 1, in the Samples Comparative Examples, the viscosity of the cream composition is remarkably increased by the above retort treatment. Further, in Samples of Comparative Examples 2 and 3, oil separation is caused by the above retort treatment.

On the other hand, in the Samples of Example 1, no increase in the viscosity of the cream composition and no oil separation are observed even when the above retort treatment is carried out.

Further, in Samples 1 to 3 of Example 1, neither oil separation nor increase in viscosity is observed even when they are sterilized at 120° C. for one hour.

EXAMPLE 2

In this Example, 30% of the above rape hardened oil, 3.0% of sodium caseinate, 1.5% of skimmed milk powder and 65.5% of water were used as raw materials.

To a mixture of the raw materials were added 0.3% of the above lysolecithin, 0.5% of the above polyglycerin fatty acid ester, and 0.3% of the above sucrose fatty acid ester.

According to the same manner as that described in Example 1, the mixture was subjected to provisional emulsification with a homomixer at 70° C. for 15 minutes. The homogenized mixture was subjected to primary homogenization with a homogenizer at the pressure of 70 kg/cm². Then, after sterilization at 145° C. for 4 to 5 seconds, the mixture was further subjected to secondary homogenization at the pressure of 70 kg/cm². The latter homogenized mixture was cooled to obtain the desired cream composition.

When the cream composition of this Example thus obtained was added to coffee prepared from 2 g of instant coffee powder, 5 g of sugar and 100 g of hot water, neither feathering nor oil separation was observed. The taste of the coffee was excellent; therefore the cream composition could be suitable used as a coffee whitener.

As described hereinabove, according to the present invention, by using lysolecithin and polyglycerin fatty acid ester in combination as an emulsifying agent, drawbacks in conventional cream compositions such as oil separation therefrom and rapid increase in viscosity thereof due to emulsion break can be eliminated, even when the cream composition alone or together with salt or acid is heated to a higher temperature such as retort treatment.

Thus, when food using the cream composition is treated at a high temperature such as retort treatment, its oil ingredient is hardly separated therefrom and/or viscosity thereof is hardly increased, and deterioration of quality of food is prevented. Further, lowering of fluidity of food is prevented, which facilitates operations such as removing food from pouches.

What is claimed is:

1. A cream composition having emulsion break resistance under heating, comprising an O/W type emulsion containing 20 to 80% by weight of an oil, 1 to 10% by weight of solids-not-fat, 20 to 80% by weight of water and an emulsifying agent comprising a combination of 0.05 to 2% by weight of lysolecithin and 0.05 to 2% by weight of polyglycerin fatty acid ester in the composition based on the mixture of raw materials, the amount of polyglycerin fatty acid ester being 0.2 to 4 parts by weight per 1 part by weight of lysolecithin.

* * * * *